United States Patent
Yamamoto et al.

(10) Patent No.: US 7,316,283 B2
(45) Date of Patent: Jan. 8, 2008

(54) AUTOMATIC TRANSMISSION CONTROLLER FOR HYBRID VEHICLE

(75) Inventors: Akihiro Yamamoto, Utsunomiya (JP); Kazuhisa Yamamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 11/046,853

(22) Filed: Feb. 1, 2005

(65) Prior Publication Data
US 2005/0178592 A1    Aug. 18, 2005

(30) Foreign Application Priority Data
Feb. 18, 2004    (JP)    ............... 2004-041627

(51) Int. Cl.
| | |
|---|---|
| B60K 1/00 | (2006.01) |
| B60K 6/00 | (2006.01) |
| B60K 17/34 | (2006.01) |
| B60K 17/00 | (2006.01) |
| B60W 10/04 | (2006.01) |
| B60W 10/10 | (2006.01) |
| B60W 10/00 | (2006.01) |

(52) U.S. Cl. ............... 180/65.2; 180/233; 180/305; 477/34; 477/39; 477/70; 903/948

(58) Field of Classification Search ............... 180/233, 180/305, 65.2; 477/34, 39, 70; 903/948
See application file for complete search history.

(56) References Cited

U.S. PATENT DOCUMENTS

| | | | | |
|---|---|---|---|---|
| 5,823,282 A | | 10/1998 | Yamaguchi | |
| 5,984,033 A | * | 11/1999 | Tamagawa et al. | 180/65.2 |
| 6,116,363 A | * | 9/2000 | Frank | 180/65.2 |
| 6,647,326 B2 | * | 11/2003 | Nakamori et al. | 701/22 |
| 7,040,433 B2 | * | 5/2006 | Yamamoto et al. | 180/65.2 |
| 2002/0084118 A1 | * | 7/2002 | Esaki | 180/65.2 |
| 2002/0107103 A1 | * | 8/2002 | Nakamori et al. | 475/116 |
| 2002/0179047 A1 | * | 12/2002 | Hoang et al. | 123/350 |
| 2003/0033070 A1 | * | 2/2003 | Amanuma et al. | 701/67 |
| 2003/0062206 A1 | * | 4/2003 | Fujikawa | 180/65.2 |
| 2003/0173125 A1 | * | 9/2003 | Ishikawa | 180/65.2 |
| 2004/0030480 A1 | * | 2/2004 | Kadota et al. | 701/70 |
| 2004/0063539 A1 | * | 4/2004 | Endo et al. | 477/45 |

FOREIGN PATENT DOCUMENTS

EP    1 342 610 A2    9/2003

(Continued)

*Primary Examiner*—Christopher P. Ellis
*Assistant Examiner*—John R. Olszewski
(74) *Attorney, Agent, or Firm*—Arent Fox LLP

(57) ABSTRACT

An automatic transmission controller for a hybrid vehicle of the present invention is used for the hybrid vehicle being a four-wheel drive vehicle and including an engine and a generator motor on a front wheel side of the hybrid vehicle and a traction motor on a rear wheel side of the hybrid vehicle. The automatic transmission controller for a hybrid vehicle includes: an automatic transmission for transmitting a driving force from the engine to an output shaft of the hybrid vehicle; and an oil pump for supplying a speed-shifting clutch of the automatic transmission with pre-pressure to eliminate play of the speed-shifting clutch, when the hybrid vehicle is driven by a driving force from the traction motor.

12 Claims, 15 Drawing Sheets

| | FOREIGN PATENT DOCUMENTS | |
|---|---|---|
| JP | 9-289706 | 11/1997 |
| JP | 11-078554 | 3/1999 |
| JP | 2000-343963 A1 | 12/2000 |
| JP | 2001-206085 A1 | 7/2001 |
| JP | 2001-206088 | 7/2001 |
| JP | 2002-160540 A1 | 6/2002 |
| JP | 2002-225578 A1 | 8/2002 |
| JP | 2003-074683 A1 | 3/2003 |
| JP | 2003-205768 A1 | 7/2003 |
| JP | 2003-240110 A1 | 8/2003 |
| JP | 2004-042734 A1 | 2/2004 |
| JP | 2004-080967 A1 | 3/2004 |
| JP | 2004-092791 A1 | 3/2004 |

* cited by examiner

AUTOMATIC TRANSMISSION CONTROLLER FOR HYBRID VEHICLE

Priority is claimed on Japanese Patent Application No. 2004-41627, filed Feb. 18, 2004, the contents of which are incorporated herein by reference.

BACKGROUND OF THE INVENTION

1. Field of the Invention

The present invention relates to an automatic transmission controller applied to a hybrid vehicle which includes an engine, a traction motor, and a generator motor, and can travel by the driving force from the individual traction motor, or the driving force from the engine.

2. Description of Related Art

Recently, there is known a hybrid vehicle wherein one of the pair of front or rear main driving wheels are driven by an engine and the other pair of front or rear sub driving wheels are driven by a motor that is connected to a battery.

In such a hybrid vehicle, the amount of fuel consumption and the exhaust gas can be decreased by selectively using the engine and the motor according to the operating state.

As this kind of hybrid vehicle, there is a vehicle wherein the deceleration energy is regenerated by a single or a plurality of motors provided in the vehicle, and used as the energy at the time of re-acceleration, to thereby increase the fuel economy. Furthermore, there is a vehicle wherein the regenerated energy is used for traveling by an individual motor in order to further increase the fuel economy.

For example, in Japanese Unexamined Patent Application, First Publication No. H09-289706, there is proposed a technique where, in a hybrid vehicle which can travel in various traveling modes such as individual motor traveling mode, engine traveling mode, and the like, vehicle mounted apparatuses can be driven even in the case in which the engine is stopped under predetermined traveling conditions.

Moreover, in Japanese Unexamined Patent Application, First Publication No. 2001-206088, there is proposed a technique where, in a hybrid vehicle which can travel by an individual motor, an individual engine, or a combination of the motor and the engine, hydraulic pressure for controlling an automatic transmission can be ensured even in the case where an abnormality arises in a multiplex communication system.

However, in the conventional hybrid vehicle, the engine is stopped when individual motor traveling (EV traveling) is performed. As a result, an oil pump mounted on the automatic transmission is not driven, so that the shift position of the automatic transmission is not fixed during the EV traveling.

Therefore, it is necessary to reset the shift position corresponding to the vehicle speed or the accelerator pedal, when shifting from the EV traveling to the engine traveling or the motor-assisted traveling. As a result, when shifting from the EV traveling to the engine traveling (engine traveling or motor-assisted traveling), the output power is not transferred to wheels until the oil pump has been activated by engine startup to increase the hydraulic pressure in the automatic transmission and a clutch in the shift position is fastened. Therefore, when shifting from the EV traveling to the engine traveling, there is a problem in which a time lag occurs until the driving force required by a driver is output, so that the engine output can not be smoothly increased, thus reducing drivability.

It is an object of the present invention to provide an automatic transmission controller for a hybrid vehicle wherein the driving force can be quickly output while decreasing the fuel consumption, and drivability can be improved.

SUMMARY OF THE INVENTION

An automatic transmission controller for a hybrid vehicle of the present invention is used for the hybrid vehicle being a four-wheel drive vehicle and including an engine and a generator motor on a front wheel side of the hybrid vehicle and a traction motor on a rear wheel side of the hybrid vehicle. The automatic transmission controller for a hybrid vehicle includes: an automatic transmission for transmitting a driving force from the engine to an output shaft of the hybrid vehicle; and an oil pump for supplying a speed-shifting clutch of the automatic transmission with pre-pressure to eliminate play of the speed-shifting clutch, when the hybrid vehicle is driven by a driving force from the traction motor.

According to the above automatic transmission controller for a hybrid vehicle, when the hybrid vehicle is driven by the driving force from the traction motor (EV traveling), the oil pump is driven to supply the pre-pressure for eliminating play of the speed-shifting clutch C to the speed-shifting clutch of the automatic transmission, so that the speed-shifting clutch can be promptly fastened according to the vehicle speed ratio or the shift position, when shifting from the EV traveling to the engine traveling. Therefore, when the hybrid vehicle is shifting from the EV traveling to the engine traveling, the driving force required by the driver can be promptly output. That is, the time lag from the time when the engine is started until the driving force is actually output, can be shortened, and acceleration traveling can be performed without causing discomfort to the driver. Moreover, during the EV traveling, the generator motor regenerates the deceleration energy as regenerated energy, so that the driving force can be promptly output while decreasing fuel consumption, and drivability can be improved.

"Eliminating play of a speed shifting clutch" in the present invention means work (operation) when shifting from the speed shifting clutch disconnection state of the automatic transmission to the connection (fastened) state, for reducing a clearance generated in the speed shifting clutch after the speed shifting clutch disconnection, so that the automatic transmission can receive the force with respect to the engine torque input by the accelerator pedal operation without delay. Moreover, a traction motor and a generator motor in the present invention mean motors which function mainly for traction or generation respectively, and allow regeneration by the traction motor or drive by the generator motor according to the traveling mode.

When the hybrid vehicle is driven by a driving force from the traction motor, the generator motor may be intermittently driven to drive the oil pump.

In this case, the generator motor can be controlled so as to generate the working pressure only in a situation where eliminating play of the speed-shifting clutch is required. Therefore the electric power consumption of the generator motor can be decreased, enabling an improvement in fuel economy.

When the hybrid vehicle is driven by a driving force from the traction motor, the generator motor may be continuously driven to drive the oil pump.

In this case, the engine can be controlled to drive promptly at any time when traveling by the driving force of the traction motor, so that reliability is improved.

The oil pump may be an electric pump.

In this case, the oil pump can be driven even when the generator motor is not driven, so that it is possible to contribute to an improvement in fuel economy.

The oil pump may be a mechanical pump.

In this case, even if the electric pump is not provided, it is possible to supply the pre-pressure by driving the generator motor. Therefore, it is not necessary to newly provide an electric pump for the vehicle, so that it is possible to contribute to a reduction in cost.

An automatic transmission controller for a hybrid vehicle of the present invention is used for the hybrid vehicle being a two-wheel drive vehicle and including an engine, a generator motor, and a traction motor on a front wheel side of the hybrid vehicle. The automatic transmission controller for a hybrid vehicle includes: an automatic transmission for transmitting a driving force from the engine to an output shaft of the hybrid vehicle; and an oil pump for supplying a speed-shifting clutch of the automatic transmission (T) with pre-pressure to eliminate play of the speed-shifting clutch, when the hybrid vehicle is driven by a driving force from the traction motor.

According to the above automatic transmission controller for a hybrid vehicle, the time lag from the time when the engine is started until the driving force is actually output, can be shortened, and acceleration traveling can be performed without causing discomfort to the driver. Moreover, during the EV traveling, the generator motor regenerates the deceleration energy as regenerated energy, so that the driving force can be promptly output while decreasing fuel consumption, and drivability can be improved.

When the hybrid vehicle is driven by the driving force from the traction motor, the generator motor may be intermittently driven to drive the oil pump.

In this case, the generator motor can be controlled to drive so as to generate the working pressure only in a situation where eliminating play of the speed-shifting clutch is required. Therefore, the electric power consumption of the generator motor can be decreased, enabling an improvement in fuel economy.

When the hybrid vehicle is driven by the driving force from the traction motor, the generator motor may be continuously driven to drive the oil pump.

In this case, the engine can be controlled to drive promptly at any time during traveling by the driving force from the traction motor, so that the reliability is improved.

The oil pump may be an electric pump.

In this case, the oil pump can be driven even if the generator motor is not driven, so that it is possible to contribute to an improvement in fuel economy.

The oil pump may be a mechanical pump.

In this case, even if the electric pump is not provided, it is possible to drive so as to supply the pre-pressure by driving the generator motor. Therefore, it is not necessary to newly provide an electric pump for the vehicle, so that it is possible to contribute to a reduction in cost.

DETAILED DESCRIPTION OF THE INVENTION

Hereunder is a description of an automatic transmission of a hybrid vehicle according to an embodiment of the present invention, with reference to the drawings.

Figure 1:
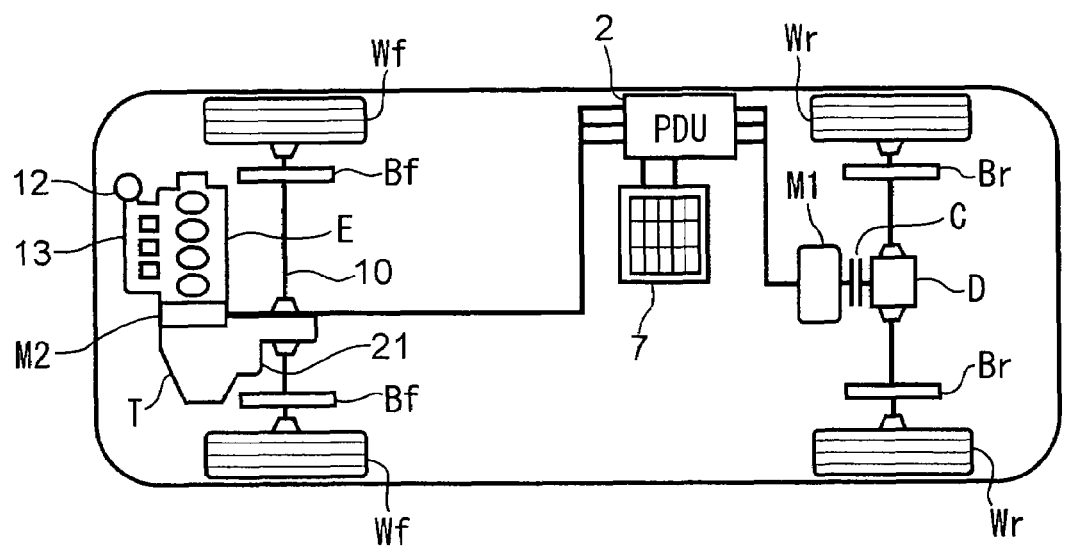
FIG. 1 is an overall block diagram of a four-wheel drive hybrid vehicle including a mechanical oil pump, to which the present invention is applied.

FIG. 1 is an overall block diagram of a hybrid vehicle to which the present invention is applied.

The hybrid vehicle shown in the figure is a four-wheel drive, including an engine E and a motor M2 on the front side, and including a motor M1 which is connected for example to an input side of a differential gear D on the rear side. In the present embodiment, the motor M1 on the rear side mainly works as a traction motor, and the motor M2 on the front side mainly works as a generator. Therefore, they are called traction motor M1 and generator motor M2 respectively in the description hereunder.

The generator motor M2 is arranged in a position sandwiched between the engine E and a transmission T (which may be an automatic transmission) having a speed-shifting clutch. Inside the transmission T, the speed-shifting clutch which mechanically disconnects and connects the driving force from the output of the engine E and the generator motor M2, is provided in a position facing the end of the generator motor M2. A mechanical oil pump 21 is provided for supplying this speed-shifting clutch with a working pressure. The mechanical oil pump 21 is driven by the drive of the generator motor M2.

On the other hand, a starting clutch C which mechanically disconnects and connects the driving force from the output of the traction motor M1, is provided between the traction motor M1 and the differential gear D.

The output power of the engine E and the generator motor M2 on the front side is transferred to front wheels Wf via the transmission T. The output power of the traction motor M1 on the rear side is transferred to rear wheels Wr via the clutch C and the differential gear D.

Figure 5:
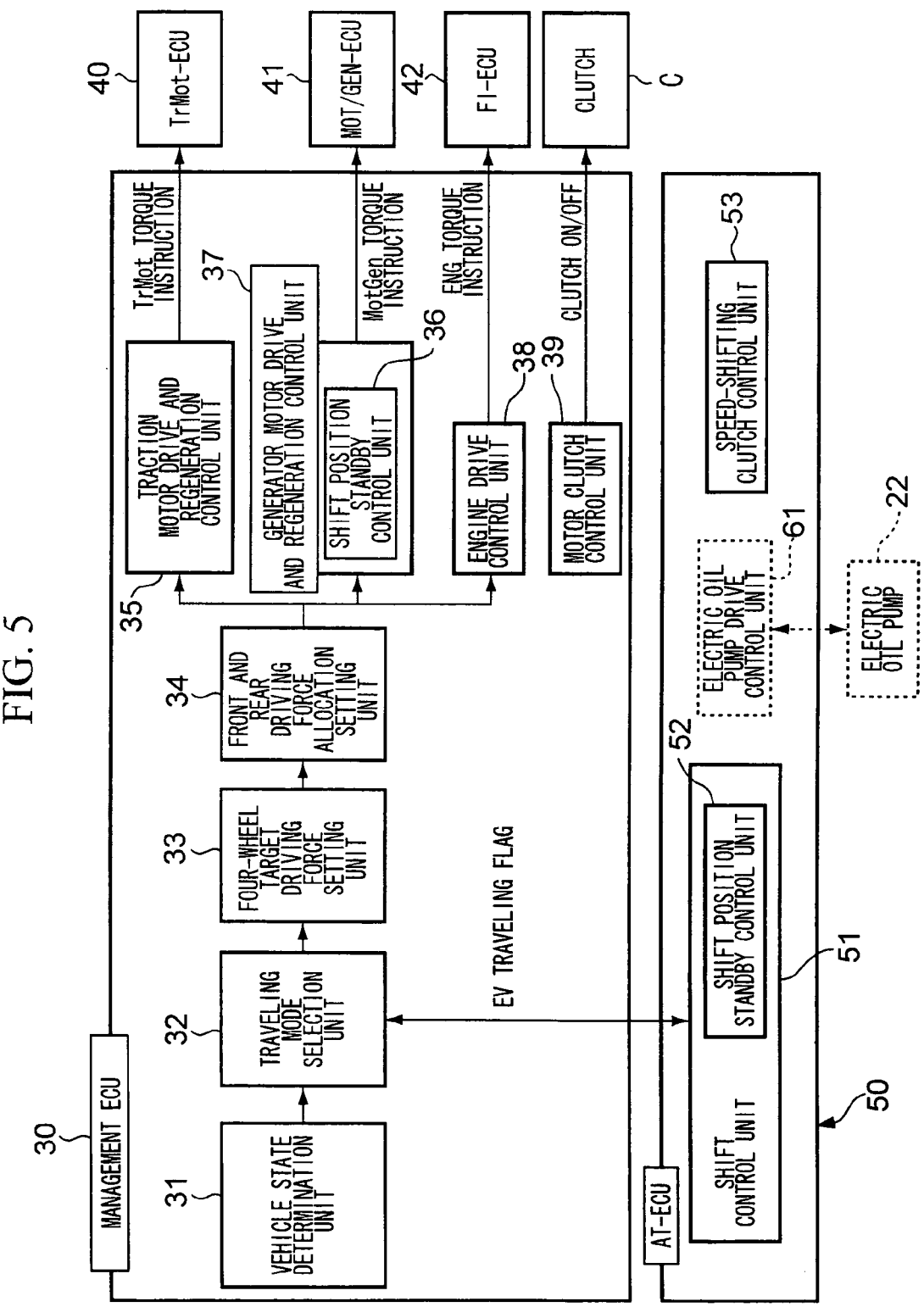
FIG. 5 is a block diagram of an ECU of the hybrid vehicles shown in FIGS. 1 to 4.

The traction motor M1 is controlled by a power drive unit (PDU) 2, receiving control instructions from a motor ECU (TrMOT-ECU) 40 which is a motor controlling device (refer to FIG. 5). Similarly, the generator motor M2 is controlled by the power drive unit (PDU) 2, receiving control instructions from a motor ECU (MOT/GEN-ECU) 41 (refer to FIG. 5).

A nickel-hydrogen battery (storage cell) 7 of a high voltage system which transfers electric power between the traction motor M1 and the generator motor M2, is connected to the power drive unit 2. An auxiliary battery which drives various auxiliary equipments is connected to the nickel-hydrogen battery 7 via a downverter which is a DC-DC converter.

The front wheels Wf driven by the engine E and the generator motor M2, have front wheel brakes Bf. Similarly, the rear wheels Wr driven by the traction motor M1, have rear wheel brakes Br.

The engine E is an inline four-cylinder type engine. An electronic controlled throttle 12 controlled by an engine ECU (FI-ECU) 42 is provided for inlet pipes 13 of the engine E. An accelerator opening sensor which detects the operation amount of an accelerator pedal (AP) (not shown) is connected to the engine ECU 42.

The engine ECU 42 calculates the fuel injection quantity from the operation amount of the accelerator pedal or the like, and outputs control signals for the fuel injection quantity to the electronic controlled throttle 12.

Figure 2:
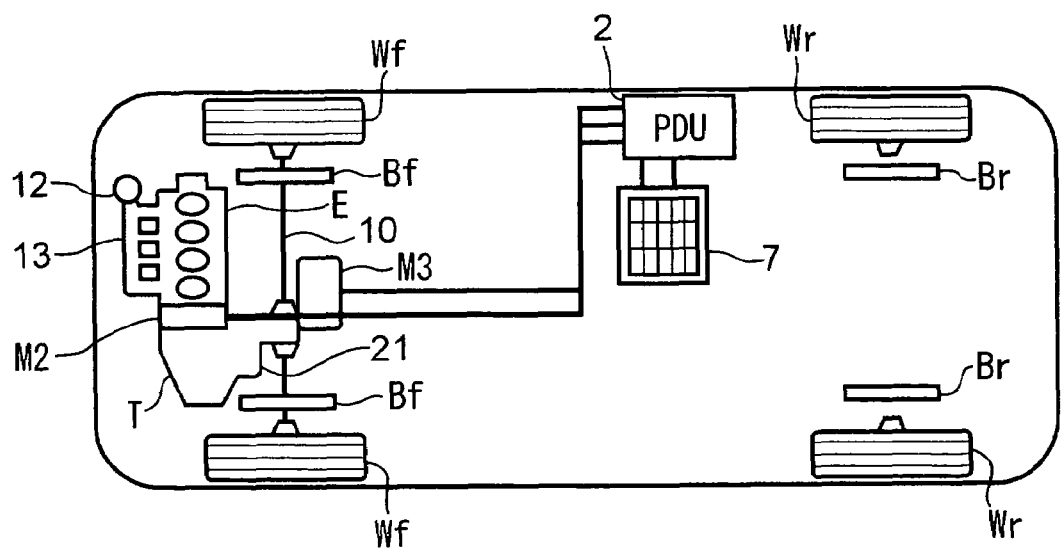
FIG. 2 is an overall block diagram of a two-wheel drive hybrid vehicle including a mechanical oil pump, to which the present invention is applied.

FIG. 2 is an overall block diagram of another hybrid vehicle to which the present invention is applied.

The difference from the hybrid vehicle shown in FIG. 1 is that the hybrid vehicle shown in the figure is a two-wheel drive, including a traction motor M3 and the generator motor M2 on the vehicle front side.

The traction motor M3 can be separated from and connected to the output shaft by a speed-shifting clutch (not shown).

Figure 3:
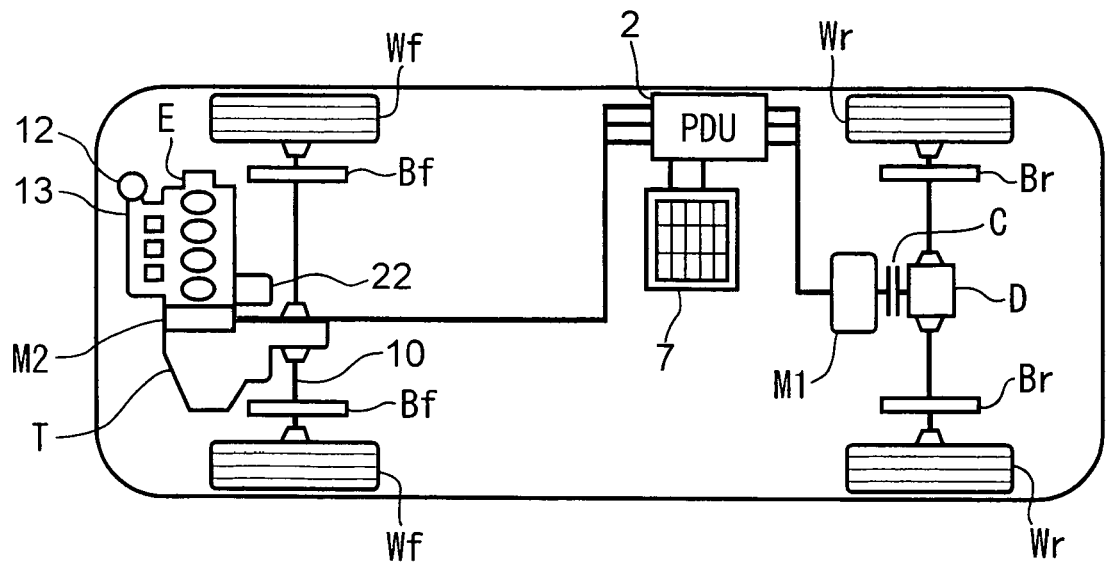
FIG. 3 is an overall block diagram of a four-wheel drive hybrid vehicle including an electric oil pump, to which the present invention is applied.

FIG. 3 is an overall block diagram of another hybrid vehicle to which the present invention is applied.

The hybrid vehicle shown in the figure is a four-wheel drive similar to the hybrid vehicle shown in FIG. 1. However, the difference is that an electric oil pump 22 is used instead of the mechanical oil pump 21 in order to drive the speed-shifting clutch of the transmission T. The electric oil pump 22 is driven by receiving electric power supply from the nickel-hydrogen battery 7.

Figure 4:
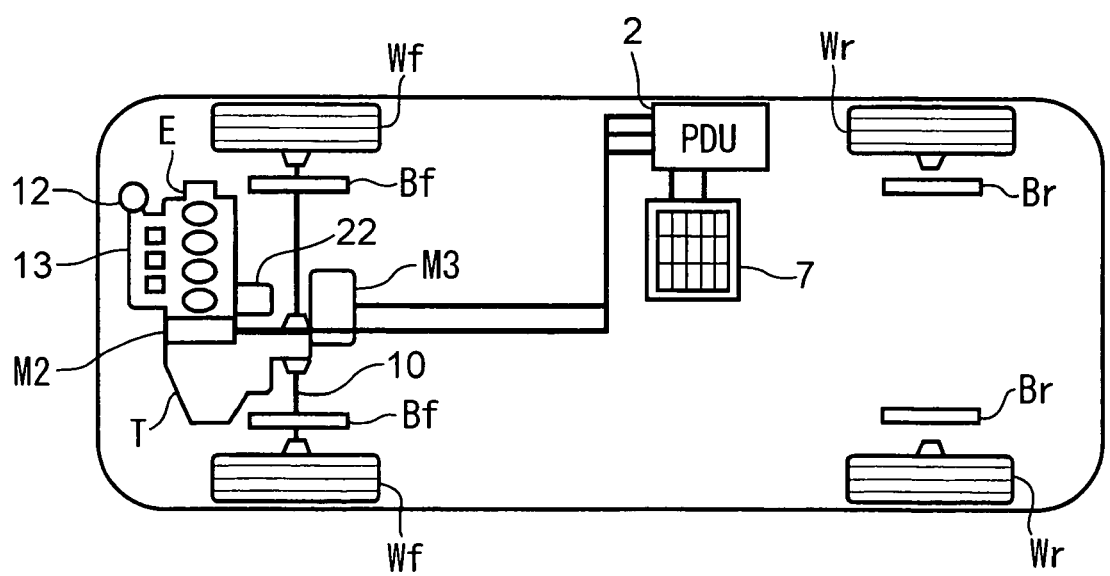
FIG. 4 is an overall block diagram of a two-wheel drive hybrid vehicle including an electric oil pump, to which the present invention is applied.

FIG. 4 is an overall block diagram of another hybrid vehicle to which the present invention is applied.

The hybrid vehicle shown in the figure is a two-wheel drive similar to the hybrid vehicle shown in FIG. 2. However, similar to the hybrid vehicle in FIG. 3, the difference from the hybrid vehicle shown in FIG. 2 is that the electric oil pump 22 is used in order to drive the speed-shifting clutch of the transmission T.

The hybrid vehicles shown in FIGS. 1 to 4 have an EV traveling mode where the vehicle travels only by the driving force from the traction motor M1 (or traction motor M3), and an engine traveling mode where the vehicle travels at least by the driving force from the engine E. The engine traveling mode includes a mode where the vehicle travels by the driving force from the individual engine E, and a mode where the vehicle travels by the driving force from the both of the engine E and the traction motor M1 (or traction motor M3). Both these two modes are called the engine traveling mode.

FIG. 5 is a block diagram of an ECU of the hybrid vehicles shown in FIGS. 1 to 4.

As shown in the figure, the ECU of each of the hybrid vehicles includes; a management ECU 30 which controls the overall of the hybrid vehicle, a traction motor ECU (TrMOT-ECU) 40 which controls the traction motor M1 that drives the wheels, a generator motor ECU (MOT/GEN-ECU) 41 which controls the generator motor M2, a FI-ECU 42 which controls the engine E, and an AT-ECU 50 which controls the clutch C and the transmission T.

In the management ECU 30, firstly, a vehicle state determination unit 31 determines the vehicle state based on information such as the operation amount of the accelerator pedal and the state of charge of the nickel-hydrogen battery 7, from various sensors. Then, from the determined vehicle state, a traveling mode selection unit 32 selects the vehicle traveling mode (EV traveling, engine traveling, and the like).

A four-wheel target driving force setting unit 33 sets the target driving force required for vehicle traveling. A front and rear driving force allocation setting unit 34 allocates the driving force respectively to the front wheel Wf side and the rear wheel Wr side. This allocation changes depending on the traveling mode. A control as hereunder is performed based on the above allocation setting.

If the traction motor M1 is controlled to drive or regenerate, a traction motor drive and regeneration control unit 35 sends a TrMOT torque instruction to the TrMOT-ECU 40 so as to control the traction motor M1.

If the generator motor M2 is controlled to drive or regenerate, an generator motor drive and regeneration control unit 37 sends a MOT/GEN torque instruction to the MOT/GEN-ECU 41 so as to control the generator motor M2.

In order to eliminate play of the speed-shifting clutch C in the case where it is determined to be necessary during the EV traveling of the vehicle (details of the determination are described later), a shift position standby control unit 36 sends a MOT/GEN torque instruction to the MOT/GEN-ECU 41 so as to control the generator motor M2.

In order to start the engine E, an engine drive control unit 38 sends an ENG torque instruction to the FI-ECU 42 so as to control the engine E.

If it is necessary to control the motor clutch (starting clutch) C, a motor clutch control unit 39 sends an ON/OFF control signal to the clutch C.

Next is a description of the AT-ECU 50. The AT-ECU 50 includes a shift control unit 51. This shift control unit 51 is connected to the traveling mode selection unit 32 in the management ECU 30, so that communication information such as an EV traveling flag, and shift position can be mutually transferred. If determined to be necessary based on this communication information, a shift position standby control unit 52 controls the shift position to stand by.

Moreover, if the vehicle includes the electric oil pump 22 (refer to FIGS. 3 and 4), an electric oil pump drive control unit 61 for controlling this electric oil pump 22 is provided. Furthermore, a speed-shifting clutch control unit 53 for controlling the speed-shifting clutch of the transmission T is provided in the AT-ECU 50.

Figure 6:
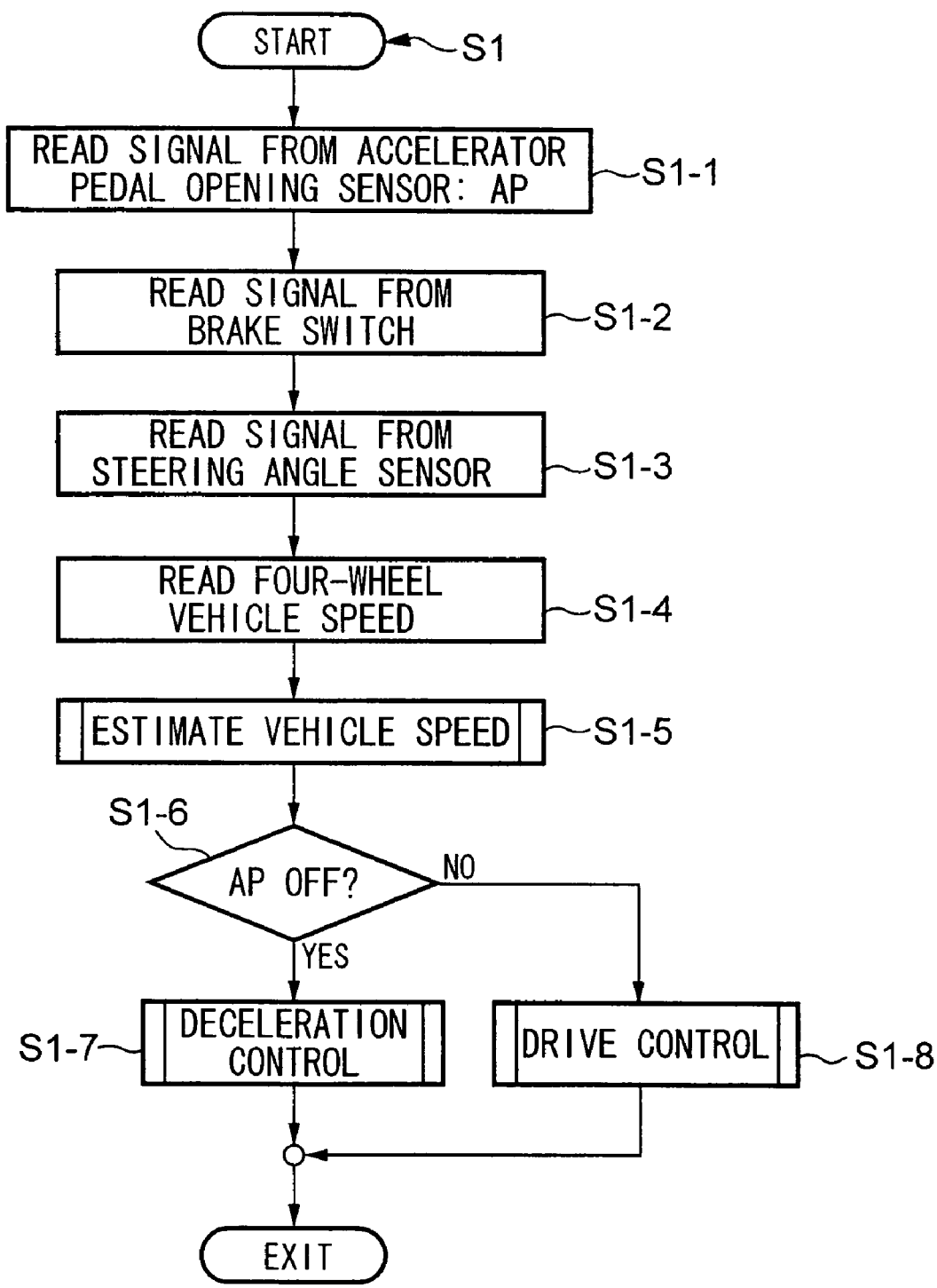
FIG. 6 is a flowchart of the main control performed in the hybrid vehicles shown in FIGS. 1 to 4.

FIG. 6 is a flowchart of the main control performed in each of the hybrid vehicles according to the abovementioned embodiments of the present invention. As shown in the drawing, firstly, in step S1-1, the vehicle state determination unit 31 reads a signal from the accelerator pedal opening sensor AP. Then, the vehicle state determination unit 31 reads a signal from the brake switch in step S1-2, a signal from the steering angle sensor in step S1-3, and four-wheel vehicle speed in step S1-4.

Then, in step S11-5, the vehicle speed is estimated based on the four-wheel vehicle speed, other rotational speed signals (for example, the motor rotational speed, the rotational speed in the transmission), acceleration signals, and the like.

In step S1-6, it is determined based on the accelerator pedal opening signal whether or not the accelerator pedal is OFF. If this determination is YES, deceleration control is performed in step S1-7. This deceleration control is performed in most cases of control at the time of deceleration. On the other hand, if the determination is NO, the flow proceeds to step S11-8 where drive control is performed. This drive control is performed in most cases of control at the time of driving. After step S1-7 and step S1-8, the series of processing is terminated respectively.

Figure 7:
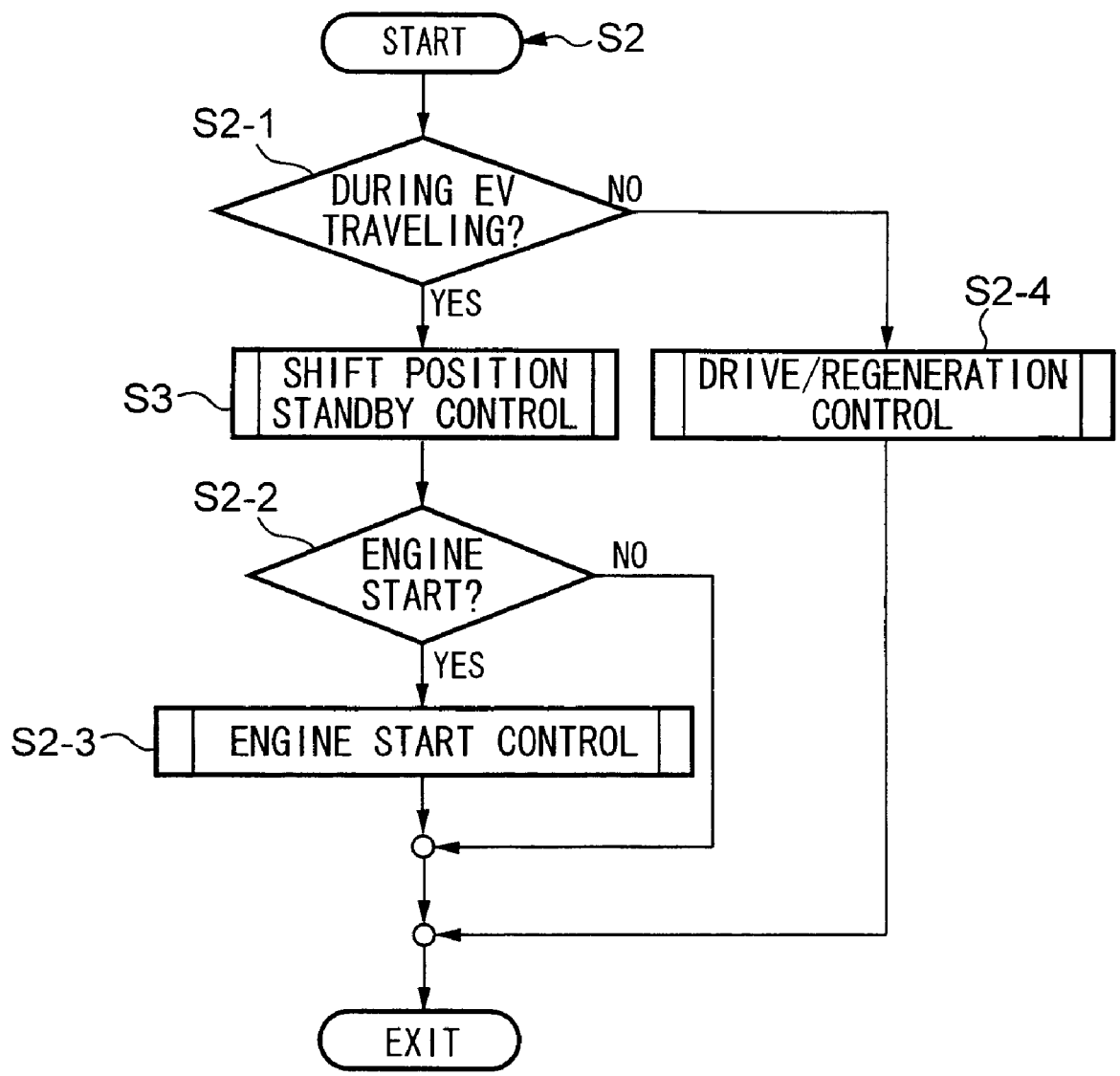
FIG. 7 is a flowchart of generator motor control performed in the hybrid vehicles shown in FIGS. 1 to 4.

FIG. 7 is a flowchart of generator motor control (step S2).

Firstly, in step S2-1, it is determined whether or not the hybrid vehicle is on the EV traveling. This is determined based on the EV traveling determination signal that is determined by the drive control in step S1-8. If the determination is YES, the flow proceeds to step S3 where shift position standby control is performed (refer to FIG. 8). If the determination is NO, the flow proceeds to step S2-4 where drive/regeneration control is performed. This control is the drive/regeneration control performed except during the time of the EV traveling. After the processing of step S2-4, the processing of the present flowchart is terminated.

On the other hand, after the processing of step S3, the flow proceeds to step S2-2 where it is determined whether or not the engine should be started. This is determined based on the engine start instruction determined by the drive control in step S1-8. This engine start instruction includes a case where it is difficult to continue the EV traveling, specifically a case where the accelerator pedal AP is pressed, a case where the state of charge of the nickel-hydrogen battery 7 is low, a case where the required driving force is greater than the driving force generated in the traction motor M1, and the like.

If the determination in step S2-2 is YES, the flow proceeds to step S2-3 where the engine start control is performed. In this engine start control, the engine is started by driving the generator motor M2 based on the engine start instruction. Then, the processing of the present flowchart is terminated. On the other hand, if the determination in step S2-2 is NO, the processing of the present flowchart is terminated at once.

Figure 8:
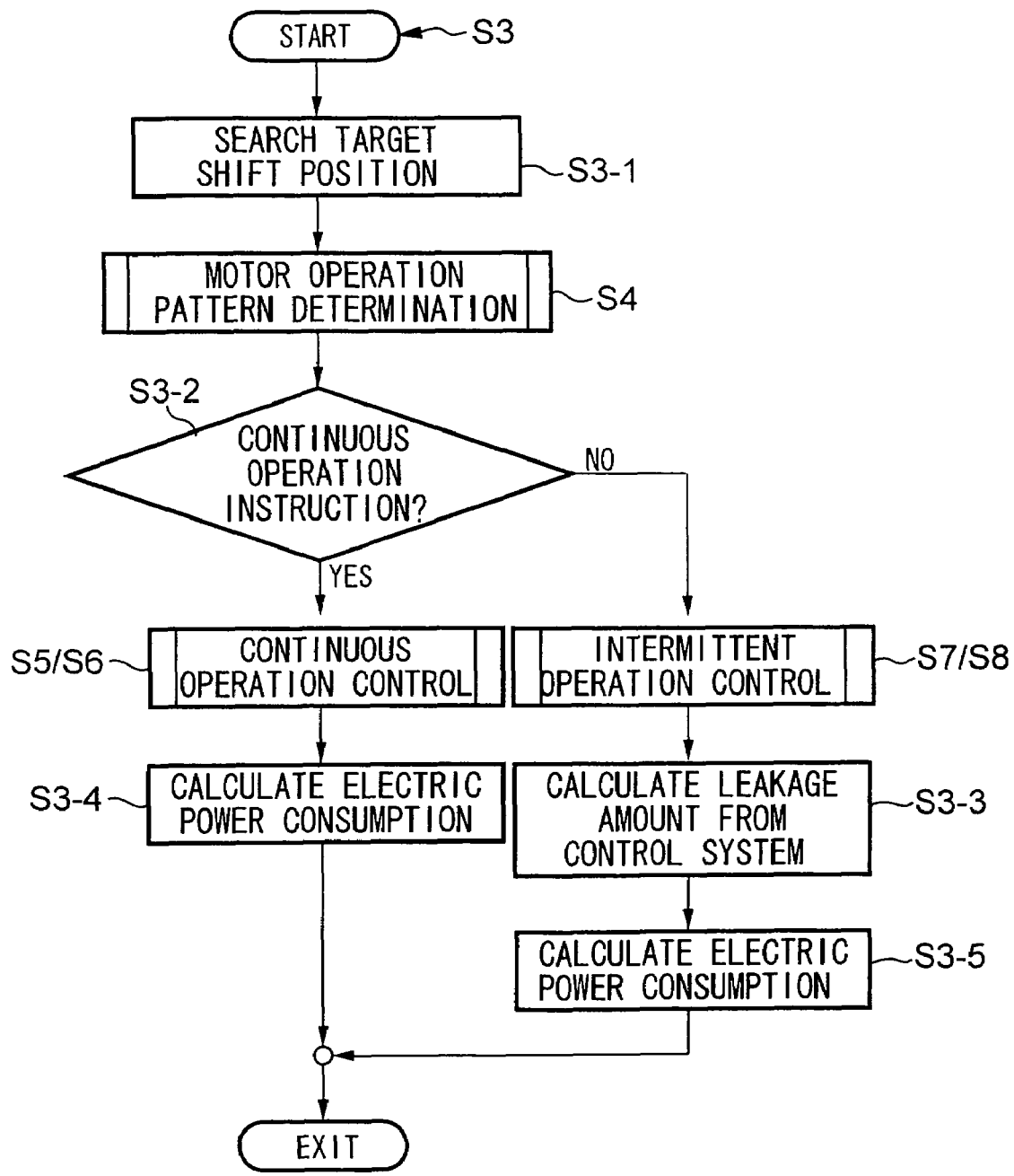
FIG. 8 is a flowchart of shift position standby control performed in the hybrid vehicles shown in FIGS. 1 to 4.

FIG. 8 is a flowchart of the shift position standby control (step S3).

Firstly, in step S3-1, the target shift position is searched. In this search, using the signal from the accelerator pedal opening sensor and the vehicle speed signal, the shift position corresponding to the vehicle speed and the accelerator opening at this time is searched, and this shift position is set as the play eliminating target shift position. Then, in step S4, motor operation pattern determination processing is performed (refer to FIG. 9).

In step S3-2, it is determined whether or not there is a continuous operation instruction from the output in step S4. If this determination is YES, continuous operation control is performed in step S5 (or step S6) (refer to FIGS. 10 and 11). Then, after the electric power consumption of the continuous operation control is calculated in step S3-4, the processing of the present flowchart is terminated.

Figure 12:
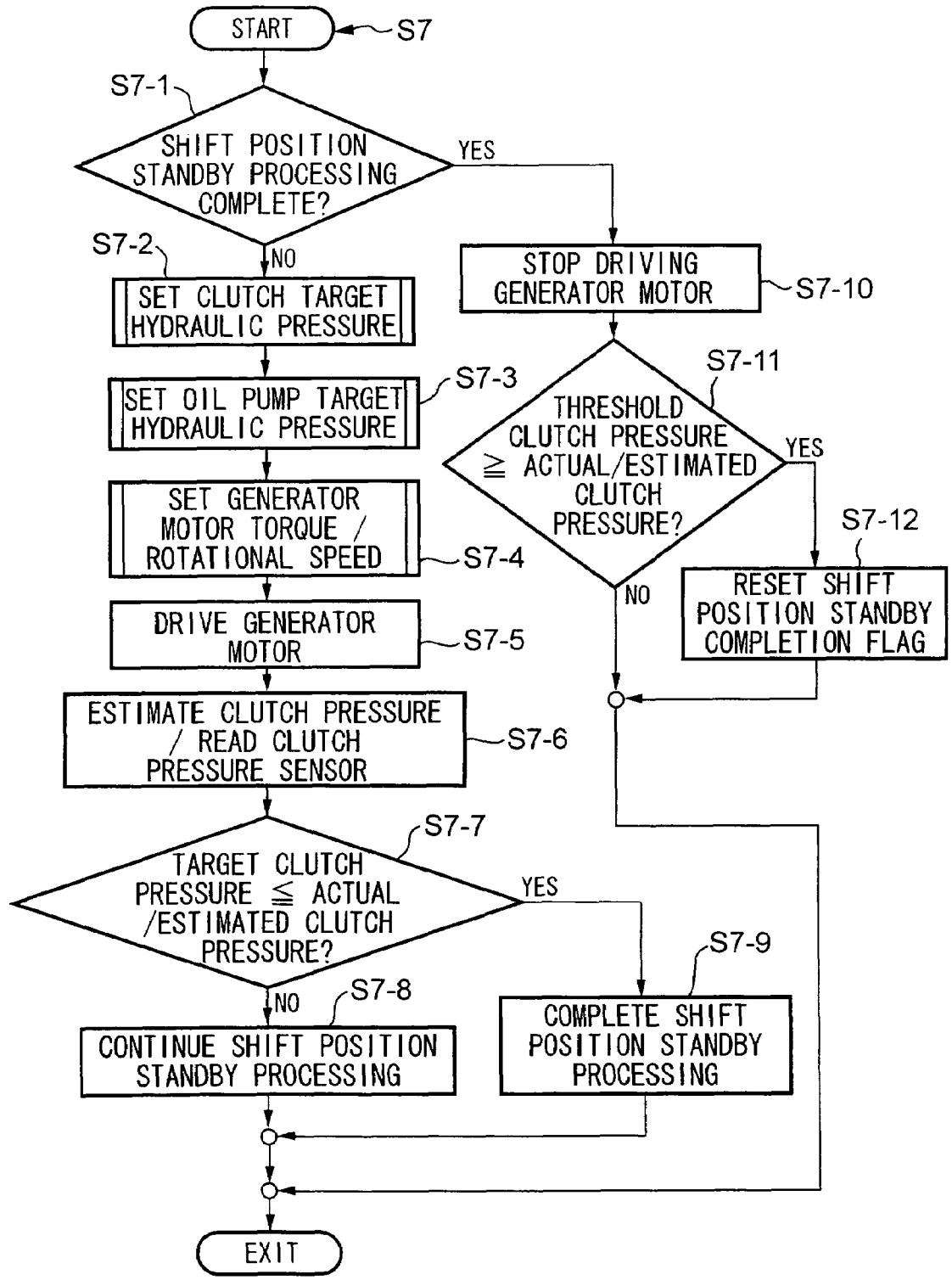
FIG. 12 is a flowchart of shift position standby control by motor intermittent operation performed in the hybrid vehicles shown in FIGS. 1 and 2.
Figure 13:
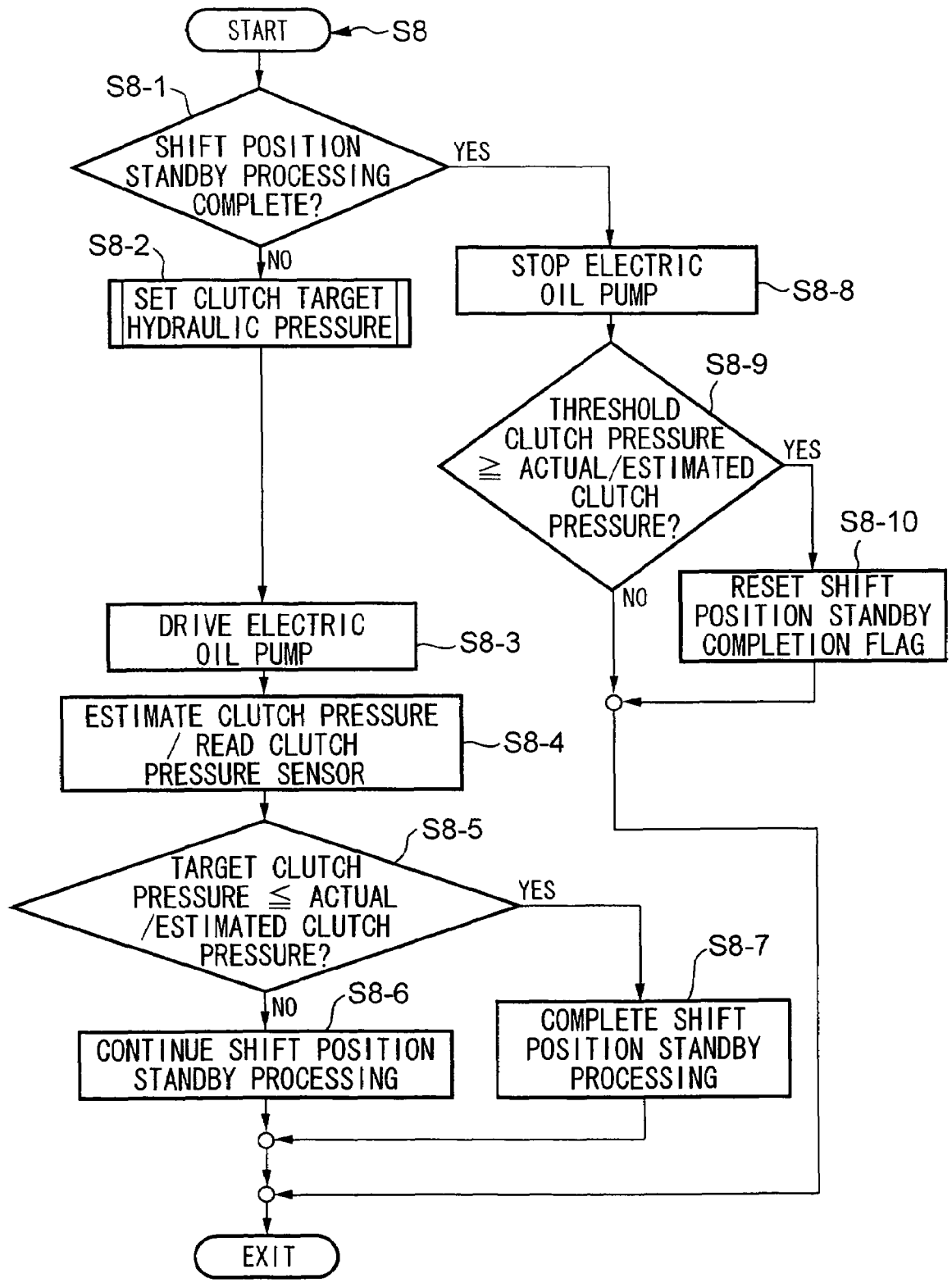
FIG. 13 is a flowchart of shift position standby control by motor intermittent operation performed in the hybrid vehicles shown in FIGS. 3 and 4.

On the other hand, if the determination in step S3-2 is NO, the flow proceeds to step S7 (or step S8) where intermittent operation control is performed (refer to FIGS. 12 and 13). Then, in step S3-3, the leakage amount from the control system (clutch pressure of the speed-shifting clutch) is calculated. In this calculation, if the clutch pressure sensor is installed, the hydraulic pressure control system leakage amount per unit time is estimated from the change in this sensor value. Then, in step S3-5, the electric power consumption in the case of the intermittent operation control is calculated, and the processing of the present flowchart is terminated.

Figure 9:
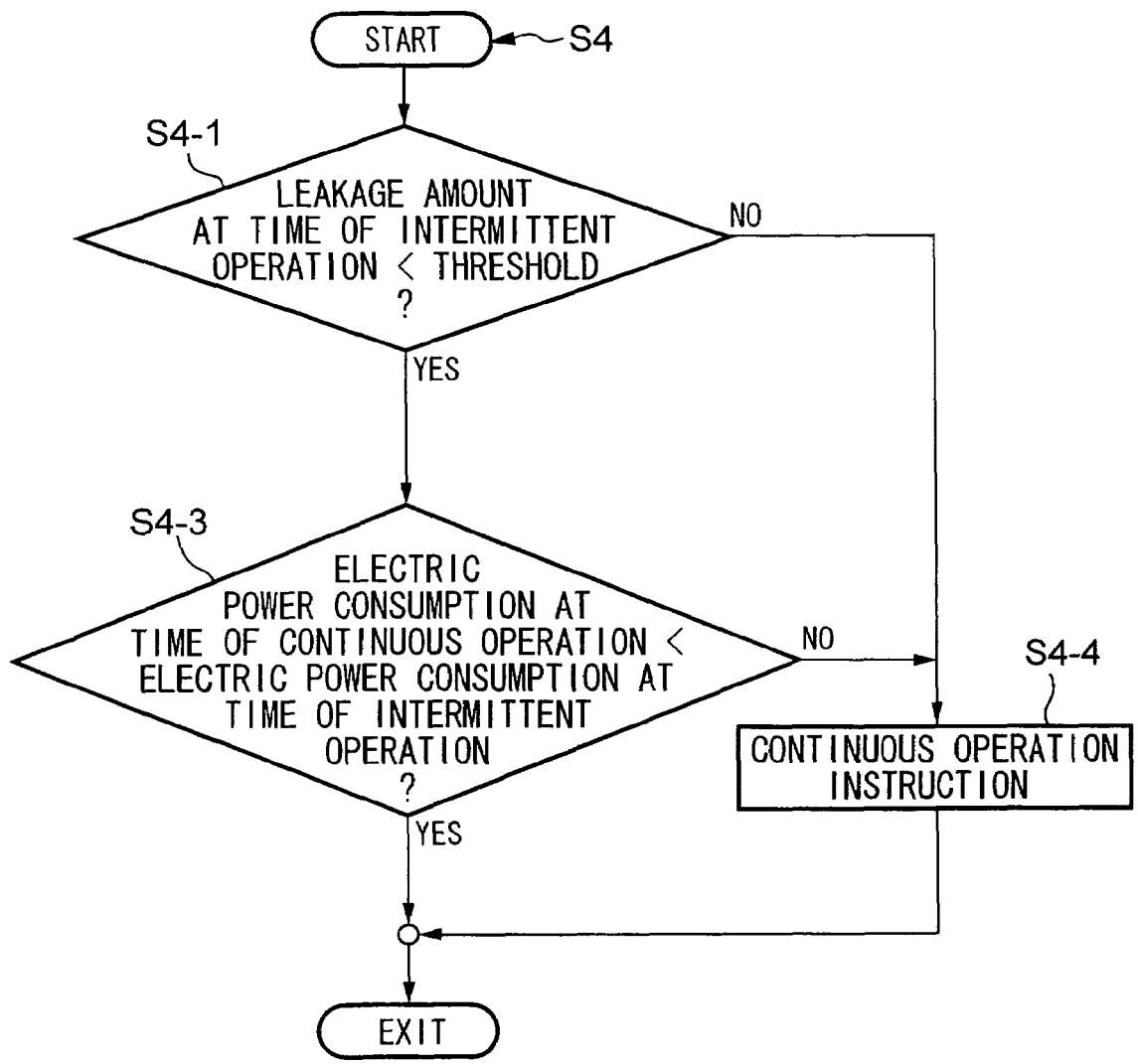
FIG. 9 is a flowchart of motor operation pattern determination control performed in the hybrid vehicles shown in FIGS. 1 to 4.

FIG. 9 is a flowchart of the motor operation pattern determination control (step S4).

Firstly, in step S4-1, it is determined whether or not the leakage amount from the hydraulic pressure control system (clutch pressure of the speed-shifting clutch) at the time of the intermittent operation is less than a threshold. If this determination is YES, the flow proceeds to step S4-3, while if this determination is NO, the flow proceeds to step S4-4.

In step S4-3, it is determined whether or not the electric power consumption at the time of continuous operation calculated in step S4-2 is less than the electric power consumption at the time of intermittent operation. If this determination is YES, the processing of the present flowchart is terminated, while if this determination is NO, the flow proceeds to step S4-4. After the continuous operation instruction is output in step S4-4, the processing of the present flowchart is terminated. In this manner, it is possible to perform control to further cut down the fuel consumption.

Figure 10:
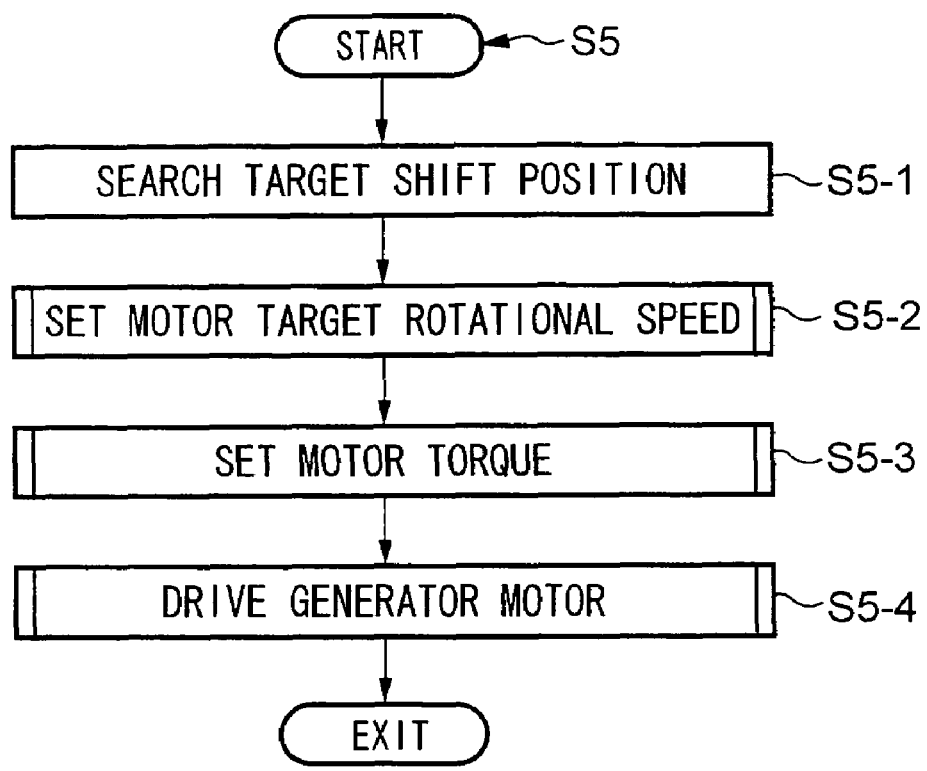
FIG. 10 is a flowchart of shift position standby control by motor continuous operation performed in the hybrid vehicles shown in FIGS. 1 and 2.

FIG. 10 is a flowchart of shift position standby control (step S5) at the time of motor continuous operation which is performed in the hybrid vehicles described using FIGS. 1 and 2. Firstly, in step S5-1, the target shift position is searched. In this search, using the signal from the accelerator pedal opening sensor and the vehicle speed signal, the shift position corresponding to the vehicle speed and the accelerator opening at this time is searched, and this shift position is set as the play eliminating target shift position.

Next, in step S5-2, the motor target rotational speed is set. In this setting, the rotational speed (oil pump rotational speed) of the generator motor M2 required for eliminating play of an engagement element of the target shift position of the automatic transmission, is set.

Then, in step S5-3, the drive of the generator motor M2 is stopped. At this time, the torque of the generator motor M2 is set so as to obtain the target motor rotational speed.

Then, in step S5-4, the generator motor M2 is driven. At this time, the generator motor M2 is driven in the condition set for it. Then, the series of processing is terminated.

Figure 11:
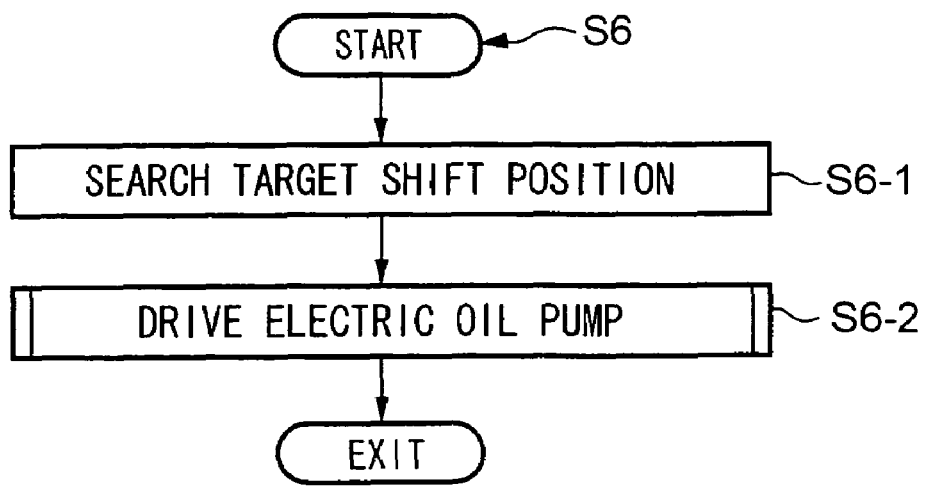
FIG. 11 is a flowchart of shift position standby control by motor continuous operation performed in the hybrid vehicles shown in FIGS. 3 and 4.

FIG. 11 is a flowchart of shift position standby control (step S6) by motor continuous operation which is performed in the hybrid vehicles described using FIGS. 3 and 4. Firstly, in step S6-1, the target shift position is searched. In this search, using the signal from the accelerator pedal opening sensor and the vehicle speed signal, the shift position corresponding to the vehicle speed and the accelerator opening at this time is searched, and this shift position is set as the play eliminating target shift position. Then, in step S6-2, the electric oil pump 22 is driven. That is, by driving the electric oil pump 22, the hydraulic pressure required for eliminating play of an engagement element of the target shift position of the automatic transmission T is supplied into the hydraulic pressure circuit inside the automatic transmission T. Then, the processing of the present flowchart is terminated.

FIG. 12 is a flowchart of shift position standby control (step S7) by motor intermittent operation which is performed in the hybrid vehicles described using FIGS. 1 and 2. Firstly, in step S7-1, it is determined whether or not the shift position standby processing is completed. If this determination is YES, the flow proceeds to step S7-10, while if the determination is NO, the flow proceeds to step S7-2.

In step S7-2, the target hydraulic pressure of the speed-shifting clutch is set. That is, the clutch pressure required for eliminating play of an engagement element of the target shift position of the automatic transmission T, is set. In step S7-3, the target hydraulic pressure of the oil pump is set so as to obtain the determined clutch pressure.

In step S7-4, the torque of the generator motor M2 and the rotational speed are set so as to obtain the oil pump pressure set in step S7-3. In step S7-5, the generator motor M2 is driven so as to obtain the set oil pump pressure.

In step S7-6, the speed-shifting clutch pressure is estimated from the torque and the rotational speed of the generator motor M2. At this time, if the clutch pressure sensor is installed, the speed-shifting clutch pressure can be directly detected by directly reading the sensor value.

In step S7-7, it is determined whether or not the actual clutch pressure or the estimated clutch pressure is greater than the target clutch pressure. If this determination is YES, the flow proceeds to step S7-9, while if the determination is NO, the flow proceeds to step S7-8. Since, in step S7-9, it can be determined that the pre-pressure for eliminating play of the speed-shifting clutch C can be supplied, it is determined that the shift position standby is completed, and the shift position standby completion flag is set to "1". On the other hand, in step S7-8, it is determined that the shift position standby processing is required to be continuously performed, and the shift position standby completion flag is set to "0".

On the other hand, if, in step S7-1, it is determined that the shift position standby is completed, then in step S7-10 drive of the generator motor M2 is stopped. Then, in step S7-11, it is determined whether or not the actual clutch pressure or the estimated clutch pressure is less than the threshold clutch pressure.

If this determination is YES, the flow proceeds to step S7-12, while if the determination is NO, the processing of the present flowchart is terminated at once. Since, in step S7-12, it can be determined that the pre-pressure required for the shift position standby can not be supplied, the value of the shift position standby completion flag is reset, and the processing of the present flowchart is terminated.

FIG. 13 is a flowchart of the shift position standby control (step S8) by motor intermittent operation which is performed in the hybrid vehicles described using FIGS. 3 and 4. Firstly, in step S8-1, it is determined whether or not the shift position standby processing is completed. If this determination is YES, the flow proceeds to step S8-8, while if the determination is NO, the flow proceeds to step S8-2.

In step S8-2, the target hydraulic pressure of the speed-shifting clutch is set. That is, the pre-pressure of the speed-shifting clutch required for eliminating play of an engagement element of the target shift position of the transmission T, is set as the target pressure.

In step S8-3, the electric oil pump 22 is driven so as to obtain the clutch pressure determined in step S8-2. In step S8-4, the clutch pressure estimated from the rotational speed of the generator motor M2 or the clutch pressure (actual clutch pressure) detected by the clutch pressure sensor is read in. In step S8-5, it is determined whether or not the actual clutch pressure or the estimated clutch pressure is greater than the target clutch pressure. If this determination is YES, the flow proceeds to step S8-7, while if the determination is NO, the flow proceeds to step S8-6. Since, in step S8-7, it can be determined that the pre-pressure required for eliminating play of the speed-shifting clutch C can be supplied, the shift position standby completion flag is set to "1", and the processing of the present flowchart is terminated. Since, in step S8-6, it can be determined that the pre-pressure required can not be supplied, the shift position standby processing is continued and the shift position standby completion flag is set to "0", and the processing of the present flowchart is terminated.

On the other hand, if, in step S8-1, it is determined that the shift position standby is completed, then in step S8-8, drive of the electric oil pump 22 is stopped. In step S8-9, it is determined whether or not the actual clutch pressure or the estimated clutch pressure is less than the threshold clutch pressure. If this determination is YES, it can be determined that the pre-pressure for eliminating play of the speed-shifting clutch C can not be supplied. Therefore, the flow proceeds to step S8-10 where the shift position standby completion flag is reset and the processing of the present flowchart is terminated.

If the determination in step S8-9 is NO, it can be determined that the pre-pressure for eliminating play of the speed-shifting clutch C can be supplied. Therefore, the processing of the present flowchart is terminated at once.

FIGS. 14 to 18 are time charts showing the vehicle state changes when the hybrid vehicle is switching from the EV traveling to the engine traveling. Specifically, state changes regarding the accelerator pedal (AP), the vehicle speed, the traction motor (M1/M3) driving force, the engine (E) driving force, the generator motor (M2) driving force, the oil pump (21 and 22) line pressure, the clutch pressure of the speed-shifting clutch, and the ratio (gear ratio) are shown.

Figure 18:
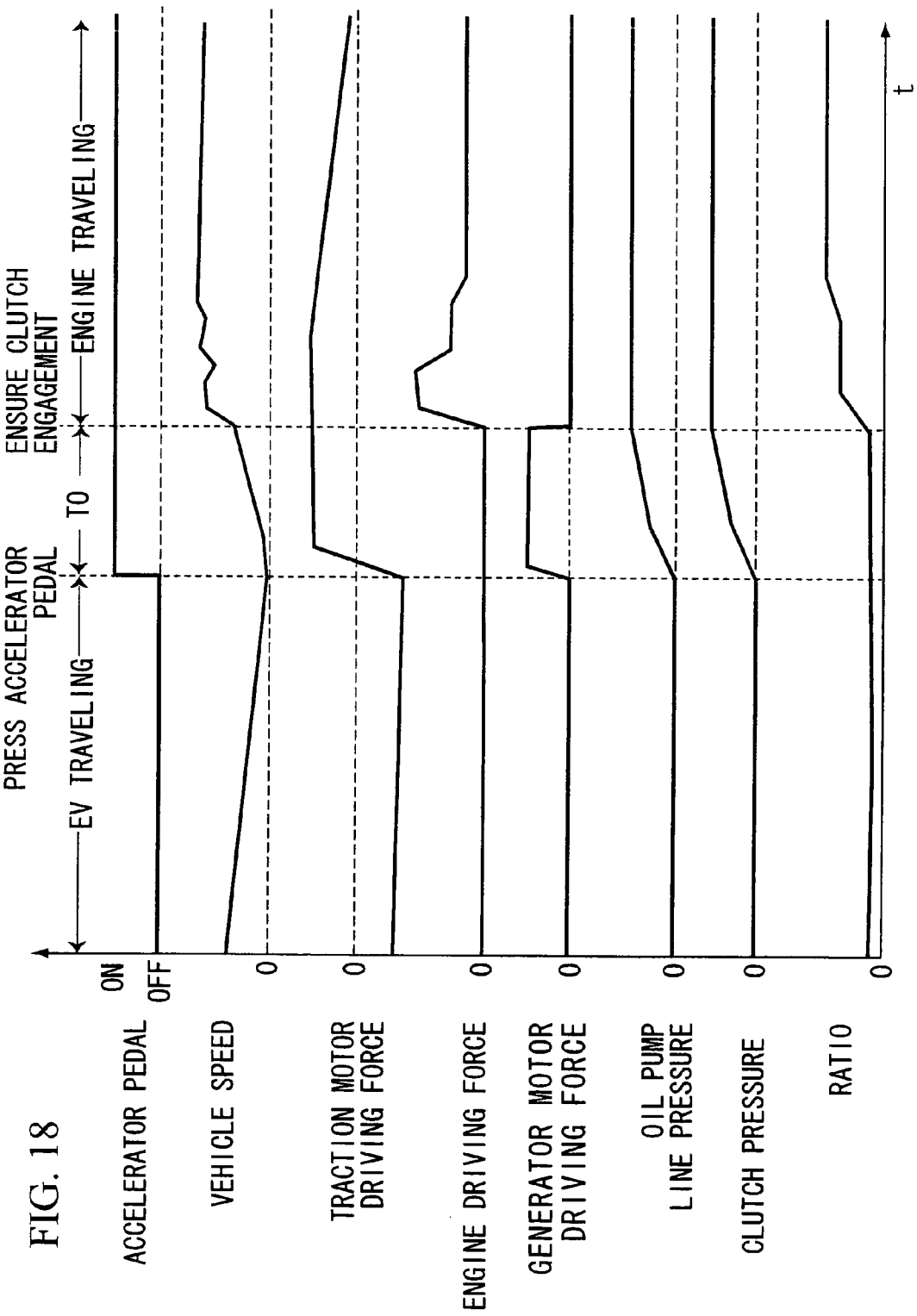
FIG. 18 is a time chart in a conventional operation control.

First is a description of a conventional case using FIG. 18. During the EV traveling, the accelerator pedal is not pressed so that the AP sensor is OFF. Moreover, the generator motor M2 is performing regeneration processing, so that the driving force becomes a negative value, according to which the vehicle speed is gradually decreased. At this time, the engine E does not generate the driving force, and the driving force from the traction motor M3 is also zero. Therefore, the line pressure of the oil pump and the speed-shifting clutch pressure of the transmission T are also zero and the ratio (gear ratio) undergoes a shift at the low value as is.

If the accelerator pedal is pressed in this state, the AP sensor comes ON, and the driving forces from the generator motor M2 and the traction motor M3 are increased. However, it takes time for the line pressure of the oil pump and the clutch pressure to reach the pressure required for the predetermined shift position. Therefore, the driving force from the engine E still remains at zero and the ratio also remains at the low value. Then, after the line pressure of the oil pump and the clutch pressure reach the working pressure so that engagement of the speed-shifting clutch is ensured, the driving force from the engine can be generated. However, a very long time T0 is required from the time when the accelerator pedal is pressed until the output from the engine E is generated.

Figure 14:
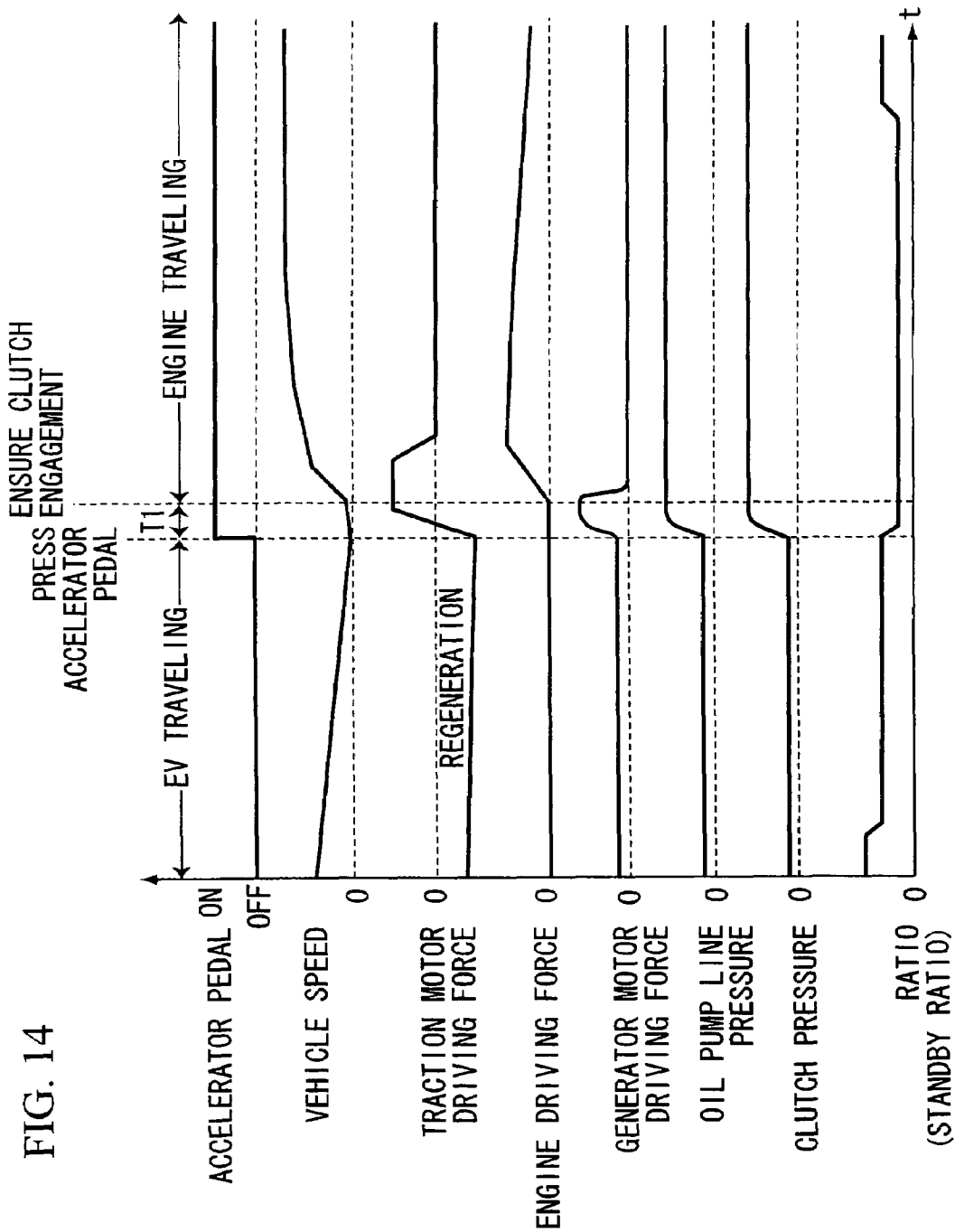
FIG. 14 is a time chart showing state change in shift position standby control by motor continuous operation in the hybrid vehicles shown in FIGS. 1 and 2.

FIG. 14 is a time chart showing the state change of the shift position standby control by the motor continuous operation, in the hybrid vehicle which is described using FIGS. 1 and 2. In this case, even when the EV traveling is performed, the mechanical oil pump 21 is driven by continuous operation of the generator motor M2, and play of the speed-shifting clutch C is eliminated so that the clutch pressure of the speed-shifting clutch can be on standby at the predetermined shift position. Consequently, when the accelerator pedal is pressed, the clutch pressure can be immediately increased to the predetermined engagement pressure so that the speed-shifting clutch can be engaged. Therefore, the driving force from the engine E can be promptly output. In this manner, a time T1 from the time when the accelerator pedal is pressed until the engine E is driven, can be greatly shortened compared to the conventional time T0. Moreover, the vehicle speed can be smoothly increased compared to the conventional case, so that drivability can also be improved.

Figure 15:
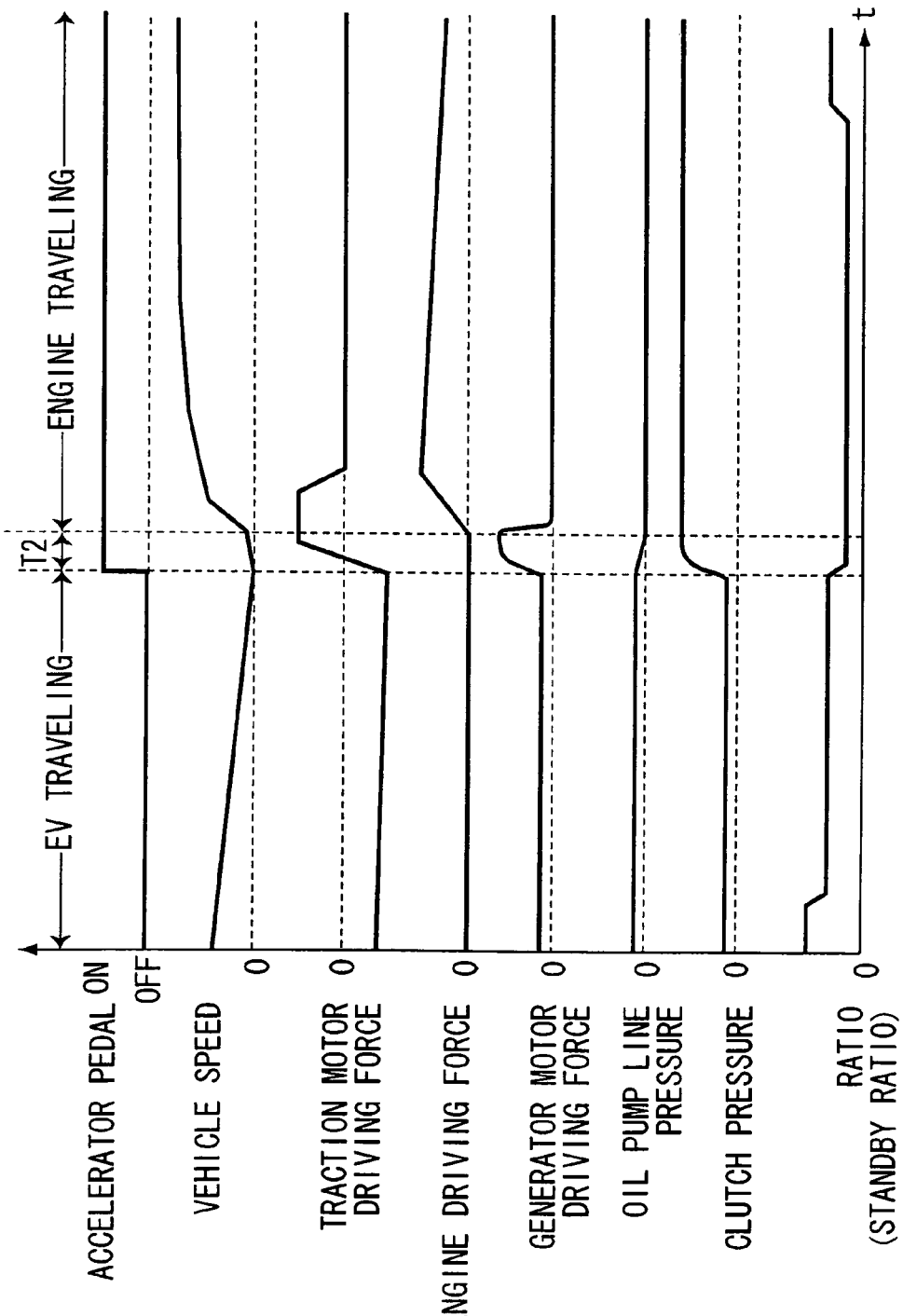
FIG. 15 is a time chart showing state change in shift position standby control by motor continuous operation in the hybrid vehicles shown in FIGS. 3 and 4.

FIG. 15 is a time chart showing the state change of the shift position standby control by the motor continuous operation, in the hybrid vehicles described using FIGS. 3 and 4. In this case, even when the EV traveling is performed, the electric oil pump 22 is driven by continuous operation of the generator motor M2, and play of the speed-shifting clutch C is eliminated so that the clutch pressure of the speed-shifting clutch can be on standby at the predetermined shift position. In this case, a time T2 from the time when the accelerator pedal is pressed until the engine E is driven, can also be greatly shortened compared to the conventional time T0.

Figure 16:
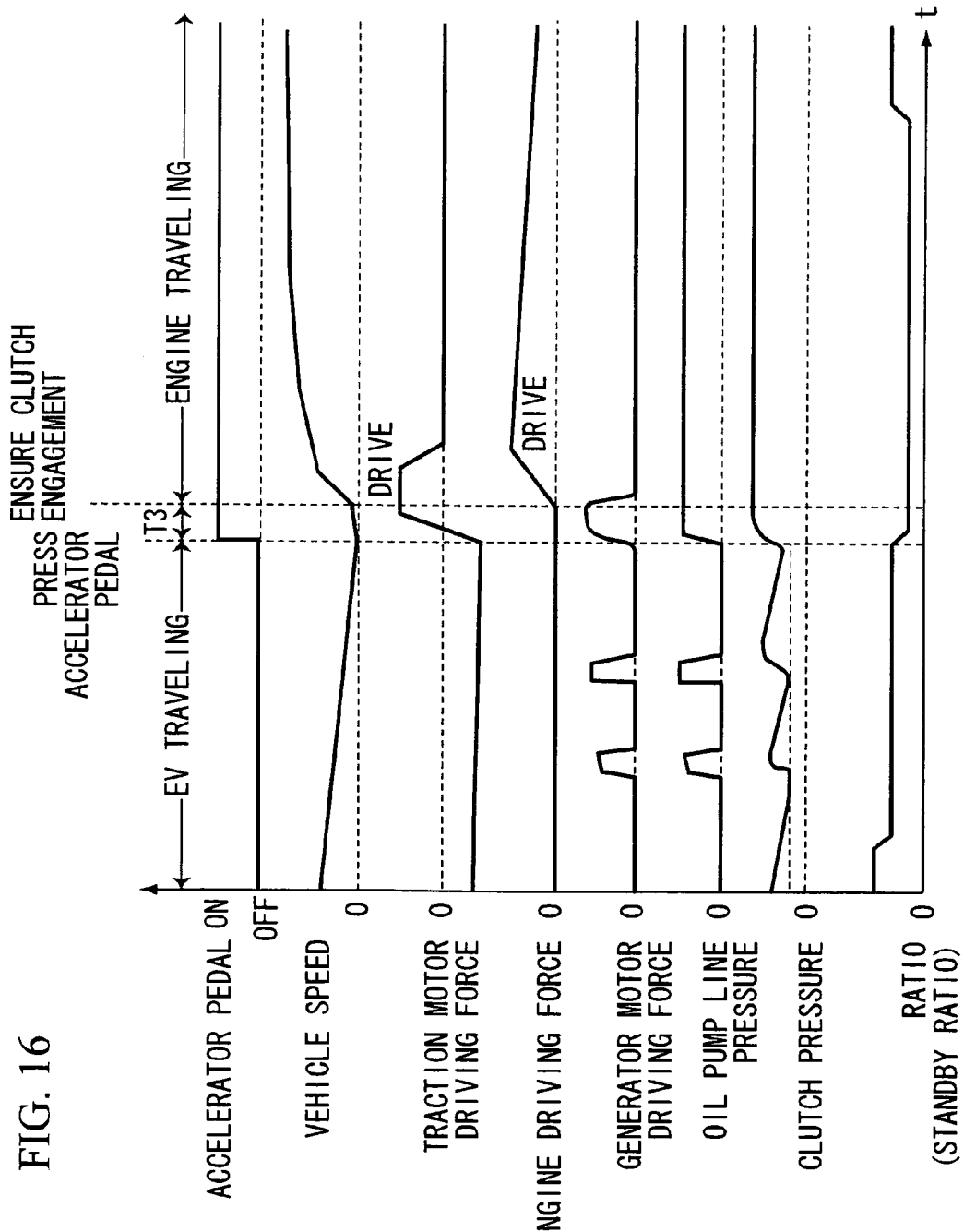
FIG. 16 is a time chart showing state change in shift position standby control by motor intermittent operation in the hybrid vehicles shown in FIGS. 1 and 2.

FIG. 16 is a time chart showing the state change of the shift position standby control by the motor intermittent operation, in the hybrid vehicles described using FIGS. 1 and 2. In this case, even when the EV traveling is performed, the mechanical oil pump 21 is driven by intermittent operation of the generator motor M2, and play of the speed-shifting clutch C is eliminated so that the clutch pressure of the speed-shifting clutch can be on standby at the predetermined shift position. In this case, a time T3 from the time when the accelerator pedal is pressed until the engine E is driven, can also be greatly shortened compared to the conventional time T0.

Figure 17:
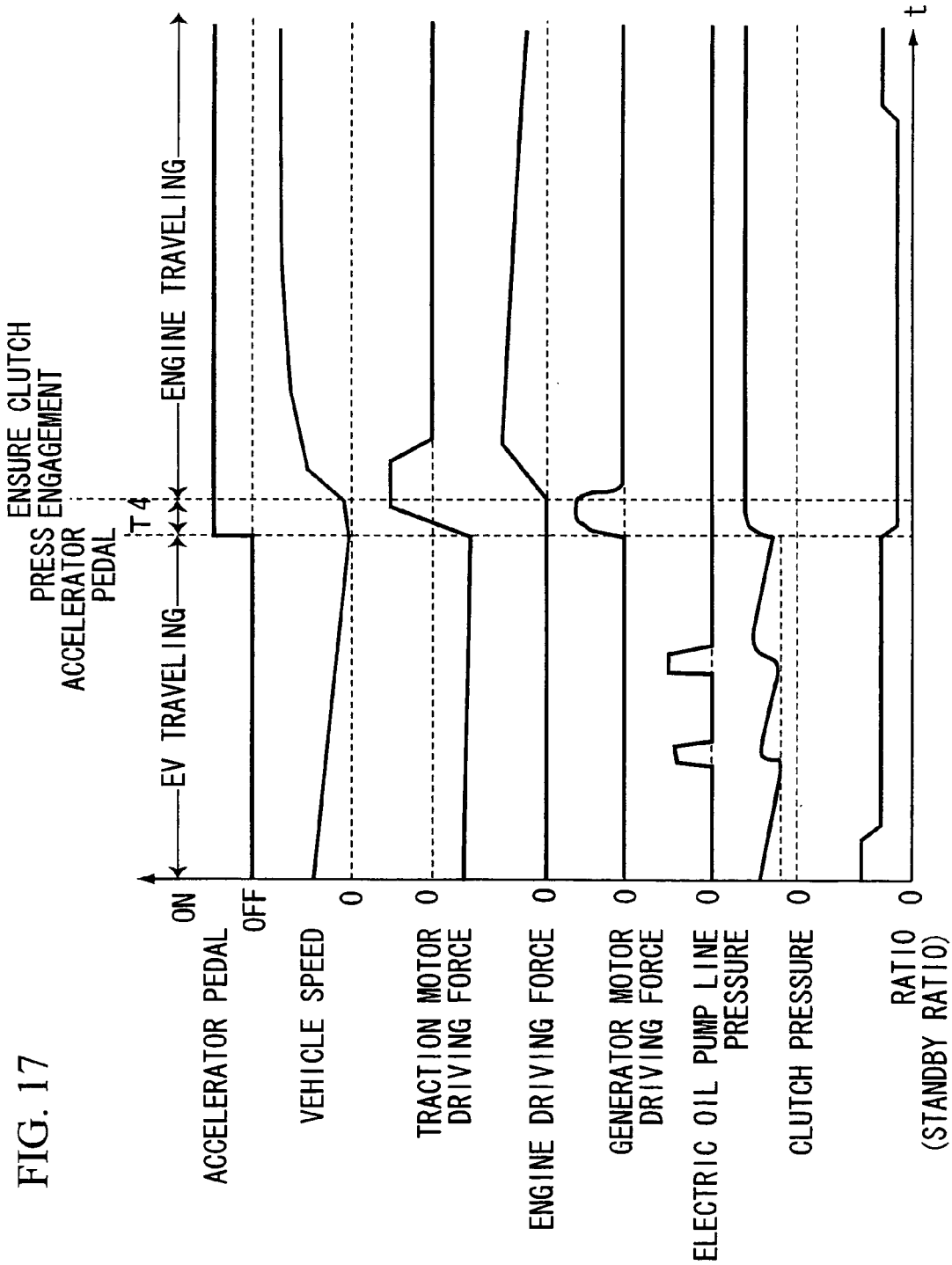
FIG. 17 is a time chart showing state change in shift position standby control by motor intermittent operation in the hybrid vehicles shown in FIGS. 3 and 4.

FIG. 17 is a time chart showing the state change of the shift position standby control by the motor intermittent operation, in the hybrid vehicle which is described using FIG. 3 and FIG. 4. In this case, even when EV traveling is performed, the electric oil pump 22 is driven by intermittent operation of the generator motor M2, and eliminating play of the speed-shifting clutch C is performed, so that the clutch pressure of the speed-shifting clutch can be on standby at the predetermined shift position. In this case, a time T4 from the time when the accelerator pedal is pressed until the engine E is driven, can also be greatly shortened compared to the conventional time T0.

The automatic transmission may be either one of AT (stepped variable transmission) and CVT (continuously variable transmission).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An automatic transmission controller for a hybrid vehicle, the hybrid vehicle being a four-wheel drive vehicle and comprising an engine and a generator motor on a front wheel side of the hybrid vehicle and a traction motor on a rear wheel side of the hybrid vehicle, the automatic transmission controller for a hybrid vehicle comprising:
    an automatic transmission which transmits a driving force from the engine to an output shaft of the hybrid vehicle, and is provided with a speed-shifting clutch which disconnects and connects the driving force from the engine and the generator motor; and
    an oil pump for supplying a speed-shifting clutch of the automatic transmission with pre-pressure to eliminate play of the speed-shifting clutch, when the hybrid vehicle is driven by a driving force from the traction motor,
    wherein in an EV traveling mode where the hybrid vehicle is driven only by the driving force from the traction motor, the oil pump is activated to supply the speed-shifting clutch with a pre-pressure for eliminating a play of the speed-shifting clutch.

2. The automatic transmission controller for a hybrid vehicle, according to claim 1, wherein when the hybrid vehicle is driven by a driving force from the traction motor, the generator motor is intermittently driven to drive the oil pump.

3. The automatic transmission controller for a hybrid vehicle, according to claim 1, wherein when the hybrid vehicle is driven by a driving force from the traction motor, the generator motor is continuously driven to drive the oil pump.

4. The automatic transmission controller for a hybrid vehicle, according to claim 1, wherein the oil pump is an electric pump.

5. The automatic transmission controller for a hybrid vehicle, according to claim 1, wherein the oil pump is a mechanical pump.

6. The automatic transmission controller for a hybrid vehicle, according to claim 1, further comprising:
    an accelerator opening sensor which measures an operation amount of an accelerator pedal;
    a vehicle speed calculation device which calculates a vehicle speed of the hybrid vehicle;
    a shift position searching device which searches a shift position based on the operation amount of the accelerator pedal and the vehicle speed, wherein
    in an EV traveling mode where the hybrid vehicle is driven only by the driving force from the traction motor:
    the shift position searching device searches a target shift position corresponding to the current vehicle speed and the current operation amount of the accelerator pedal;
    the pre-pressure which is necessary for eliminating a play of an engagement member of the speed-shifting clutch is set based on the target shift position searched by the shift position searching device; and
    the oil pump is activated to supply the speed-shifting clutch with the pre-pressure.

7. An automatic transmission controller for a hybrid vehicle, the hybrid vehicle being a two-wheel drive vehicle and comprising an engine, a generator motor, and a traction motor on a front wheel side or a rear wheel side of the hybrid vehicle, the automatic transmission controller for a hybrid vehicle comprising:

an automatic transmission which transmits a driving force from the engine to an output shaft of the hybrid vehicle, and is provided with a speed-shifting clutch which disconnects and connects the driving force from the engine and the generator motor; and an oil pump for supplying a speed-shifting clutch of the automatic transmission with pre-pressure to eliminate play of the speed-shifting clutch, when the hybrid vehicle is driven by a driving force from the traction motor, wherein in an EV traveling mode where the hybrid vehicle is driven only by the driving force from the traction motor, the oil pump is activated to supply the speed-shifting clutch with a pre-pressure for eliminating a play of the speed-shifting clutch.

8. The automatic transmission controller for a hybrid vehicle, according to claim 7, wherein when the hybrid vehicle is driven by a driving force from the traction motor, the generator motor is intermittently driven to drive the oil pump.

9. The automatic transmission controller for a hybrid vehicle, according to claim 7, wherein when the hybrid vehicle is driven by a driving force from the traction motor, the generator motor is continuously driven to drive the oil pump.

10. The automatic transmission controller for a hybrid vehicle, according to claim 7, wherein the oil pump is an electric pump.

11. The automatic transmission controller for a hybrid vehicle, according to claim 7, wherein the oil pump is a mechanical pump.

12. The automatic transmission controller for a hybrid vehicle, according to claim 7, further comprising:

an accelerator opening sensor which measures an operation amount of an accelerator pedal;

a vehicle speed calculation device which calculates a vehicle speed of the hybrid vehicle;

a shift position searching device which searches a shift position based on the operation amount of the accelerator pedal and the vehicle speed, wherein in an EV traveling mode where the hybrid vehicle is driven only by the driving force from the traction motor:

the shift position searching device searches a target shift position corresponding to the current vehicle speed and the current operation amount of the accelerator pedal;

the pre-pressure which is necessary for eliminating a play of an engagement member of the speed-shifting clutch is set based on the target shift position searched by the shift position searching device; and the oil pump is activated to supply the speed-shifting clutch with the pre-pressure.

\* \* \* \* \*